United States Patent [19]

Yoshida

[11] Patent Number: 5,024,525

[45] Date of Patent: Jun. 18, 1991

[54] PHOTO SENSING DEVICE

[75] Inventor: Hajime Yoshida, Tokyo, Japan

[73] Assignee: Hajime Industries Ltd., Tokyo, Japan

[21] Appl. No.: 478,200

[22] Filed: Feb. 9, 1990

[30] Foreign Application Priority Data

Feb. 17, 1989 [JP] Japan .................................. 1-37664

[51] Int. Cl.⁵ .............................................. G03B 15/02
[52] U.S. Cl. .................................. 354/126; 354/290;
355/67; 353/71; 362/16
[58] Field of Search ................ 354/126, 81, 287, 290,
354/291, 292, 295; 355/71, 67, 70; 362/3, 7, 8,
11, 16; 352/48, 49, 88, 243

[56] References Cited

U.S. PATENT DOCUMENTS

| 1,893,211 | 1/1933 | Simjian | 354/290 X |
|---|---|---|---|
| 3,709,119 | 1/1973 | Van Der Meer | 354/81 |
| 3,737,226 | 6/1973 | Shank | 362/16 X |
| 4,019,042 | 4/1977 | Baliozian | 362/16 |
| 4,089,017 | 5/1978 | Buldini | 354/81 |

FOREIGN PATENT DOCUMENTS

| 58-111024 | 7/1983 | Japan | 354/292 |
|---|---|---|---|
| 63-223732 | 9/1988 | Japan | 354/290 |

Primary Examiner—Brian W. Brown
Assistant Examiner—Howard B. Blankenship
Attorney, Agent, or Firm—Bauer & Schaffer

[57] ABSTRACT

A photosensing device in which a camera picks up through a see through-hole formed through a light diffuser reflection board an image of an object to be photosensed that has a high light reflectivity and that is indirectly irradiated upon by a light source, a member having a light reflectivity substantially same as that of the light diffuser reflection board and a property to pass therethrough the light is tightly fit to the see through-hole, and the camera picks up the object to be photosensed through the member.

7 Claims, 2 Drawing Sheets

PHOTO SENSING DEVICE

BACKGROUND OF THE INVENTION

1. Field of the Invention

The present invention relates generally to photosensing devices and is directed more particularly to such a photosensing device that is used to photosense an object with high reflectivity.

2. Description of the Prior Art

The role of camerae is vast such as a still camera purposed for prints, a camera for movie-picturing, or a CATV system which transmits an image to a far distance place, and an image senser that is used on a visual inspection apparatus which uses a television camera and an electronic processor to replace the human eye.

It can be further said that upon the picturing or photosensing an object with such camerae, an illumination device is essential where it is further noted that the lighting (illumination) techniques cannot be overlooked when the illumination device is used to irradiate on an object to be photo-sensed. For example, excelecnt photosensing cannot be obtained unless the lighting has been planned or revised to accomodate the different shaped object bodies such as light transparent objects of glass or the like, or powders, liquids and then objects with high light reflectivity such as metals, or flat plane objects and those with surface uneveness, lumpy solid objects, etc., because objects with such varied shape and optical characteristics will have to be photosensed by the camerae in a manner that the object features are cleverly picked up.

As an example, it is extremely difficult to photosense an object made of metal with a glossy surface (high light reflectivity). This is owing to the metal surface of the object having a high reflectivity for light where the light from a light source is reflected and the reflected light itself performs as a very strong high light so that the light source itself will be overlapped on the object upon being photosensed.

Therefore, upon photosensing such objects having high reflectivity for light, the normal direct lighting, which is to directly irradiate the light onto the object must be avoided, and it is known to be a commonsensed lighting method to apply an indirect illumination on the object with the diffused light through light diffusers or the like.

FIG. 1 and FIG. 2 respectively show examples of photosensing arrangements that use the prior art lighting methods.

On FIG. 1, reference numeral 1 designates an object to be photosensed or picked up, 2 an camera which photosenses or picks up the object 1 from above, and $3_1$, $3_2$ and $3_3$ light sources respectively for the irradiation (lighting) onto the object 1 which is placed under the camera 1. Reference numeral 4 denotes a light diffuser reflection board that is made of an opaque meterial and placed near the camera 2 between the object 1 and camera 2. A see through-hole 5 is formed through the light diffuser reflection plate 4 at a location that faces the camera 2 because the camera 2 must photosense the object 1 that is situated undrer the opaque light diffuser reflection board 4 through the through-hole 5. A support plate 6 is provided for supporting the object 1 that is located under the light diffuser reflection board 4 while at the same time it serves as the background to the object 1. As the support plate 6, such a plate which reflects the incident light by a small amount is used when the object 1 is to be photosensed whitish or bright, or to the contrary such a plate which reflects the incident light much is used when the object 1 is to be expressed blackish or darkish. At this time, it is needless to say that either of the light sources $3_1$ to $3_3$ do not irradiate directly upon the object 1 and as shown on FIG. 1, the lights from the light sources $3_1$ to $3_3$ are once reflected by the undersurface of the light diffuser reflection board 4 where such reflected lights irradiates upon the object 1 (indirect lighting) which is placed on the support plate 6 that is located under the light diffuser reflection board 4 as previously stated (see light paths A1, A2 and A3 in FIG. 1).

Now then, in the case of FIG. 1 as shown on the drawing, in order to photosense the object 1 by the camera 2, the see through-hole 5 formed through the light diffuser reflection board 4 is of the minimum diameter range that will enable the photosensing.

FIG. 2 shows another example of the prior art similar to that shown in FIG. 1, but the difference between the example of FIG. 2 and the example of FIG. 1 is that on the case of FIG. 1, the lights from light sources $3_1 \sim 3_3$ are once reflected by the light diffuser reflection board 4, which reflected lights are used to irradiate on the object 1, whereas on the example of the FIG. 2, the object 1 is surrounded by a cylindrical-shaped light diffuser cylinder 7 to which the lights from the light sources $3_1 \sim 3_3$, that are located outside the cylinder 7 are irradiated once on the light diffuser cylinder 7 which will pass the lights therethrough and diffuse the same. The light thus diffused is used to irradiate onto the object 1 that is located inside the light diffuser cylinder 7. In this case also, since the camera 2 will photosense the object 1 through the light diffuser reflection board 4, it is needless to say that a small diameter see through-hole 5 as same as the case in FIG. 1 is made available at a predetermined location on the light diffuser reflection board 4.

The same symbols indicate the same components on FIG. 2 respectively FIG. 1.

As shown on the examples on FIG. 1 and FIG. 2, although an indirect lighting method is applied to the object 1 to be photosensed which is a metal product or the like that has a mirror like surface with a high reflectivity, and through the see through-hole 5 provided at a portion of the light diffuser reflection board 4, the object 1 to be photosensed can be photosensed by camera 2, one problem arises. That is, when the object 1 is a body that tends to easily reflect light, the image of the through-hole 5 is made by the object 1, so that the camera 2 shall photosense the image of the see through-hole 5 overlapped on a part of the image of the object 1. Therefore, normally, in order to avoid this phenomenon, there is caused such a defect that the see through-hole 5 be made so small so far as it would not interfere the picturing of the object 1 or the object 1 is photosensed from the distance apart.

Concerning the above-mentioned defect, as the distance between the camera 2 and object 1 become long, the light sources $3_1 \sim 3_3$ which emit intensive lights become necessary which makes the device high costing and bulky in size.

Further, since the see through-hole 5 shall be made small in diameter, the amount of light incident to the camera 2 therethrough is reduced so that a high costing high sensitivity camera becomes required.

OBJECTS AND SUMMARY OF THE INVENTION

Therefore, it is an object of the present invention to propose a photosensing device free from the problems inherent in the prior art.

According to an aspect of the present invention, there is provided a photosensing device in which a camera picks up, through a see through-hole formed through a light diffuser reflection board, an image of an object to be photosensed that has a hight light reflectivity and that is indirectly irradiated upon by a light source, comprising:

a member having a light reflectivity substantially same as that of said light diffuser refelction board and a property to pass therethrough the light, said member being tightly fit to said see through-hole and said camera picking up said object to be photosensed through said member.

The other objects, features and advantages of the present invention will become apparent from the following description taken in conjunction with the accompanying drawings through which like references designate the same elements and parts.

DESCRIPTION OF THE PREFERRED EMBODIMENT

An example of the present invention will be explained hereunder in reference with the attached drawings.

Figure 1:
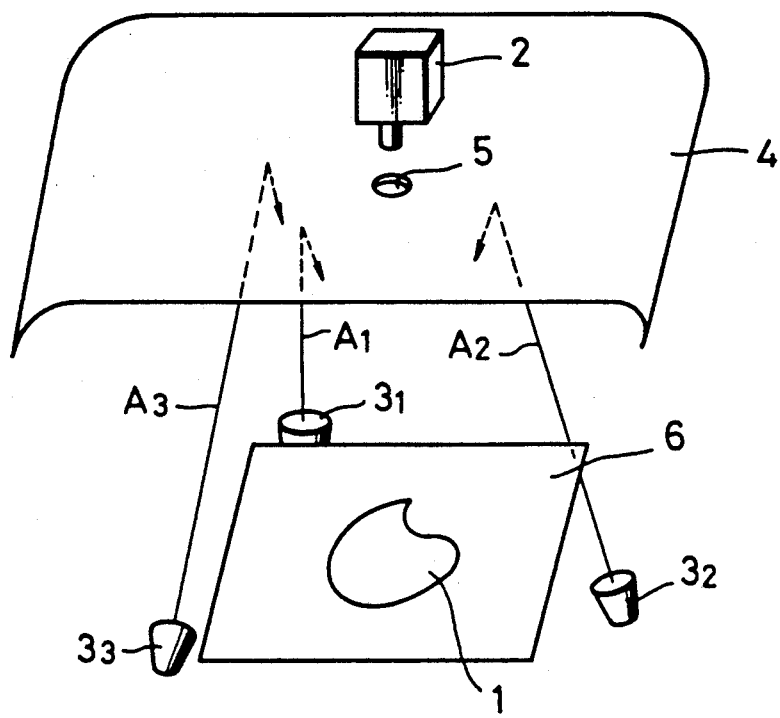
FIG. 1 and FIG. 2 are respectively perspective diagrams showing photosensing devices of the prior art.
Figure 3:
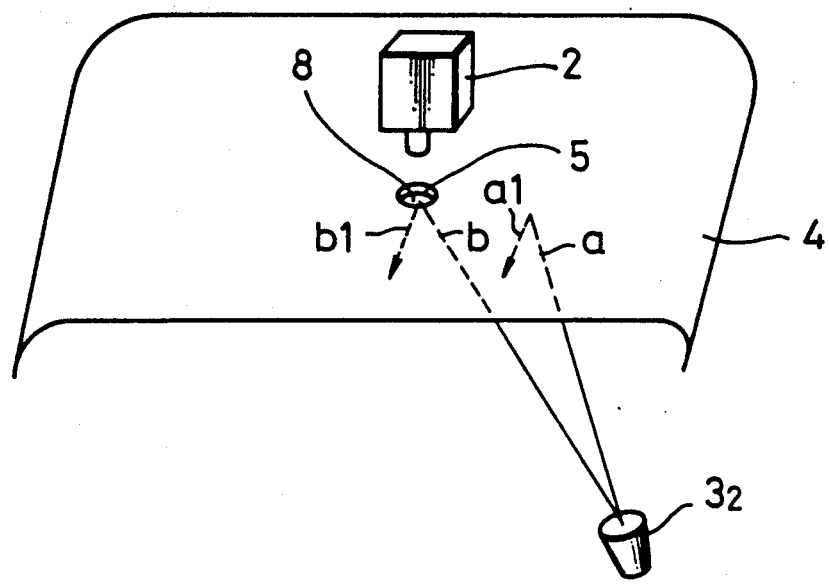
FIG. 3 is a perspective view showing the main portion of an example of the photosensing device according to the present invention.
Figure 4:
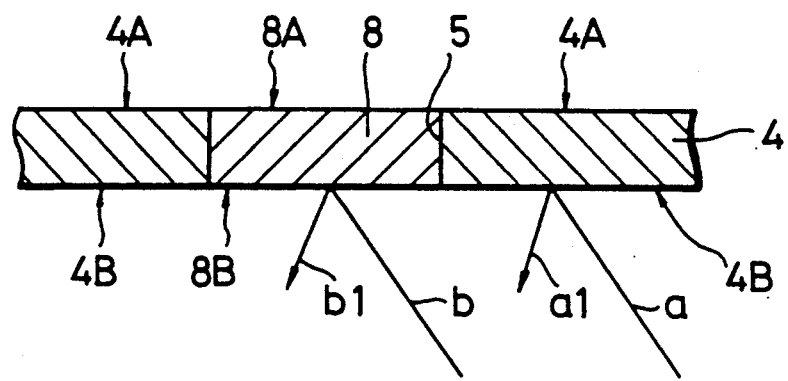
FIG. 4 is a magnified side cross-sectional view of the main part of FIG. 3.

FIG. 3 is a perspective view showing a main portion of an example of the present invention which is applied to the prior art example as shown on FIG. 1, and FIG. 4 is a magnified cross section diagram of the main part of FIG. 3. Further, the parts not shown on FIG. 3 are exactly the same to the parts as shown on FIG. 1.

As shown on FIG. 3 and FIG. 4, in the present invention, a member 8 which generally has the light reflectivity same as that of the light diffuser reflection board 4 and at the same time enables to pass the light therethrough, such as a half mirror, a semi transparent plate or the like is tightly fitted or adhered closely into the see through-hole 5 that is provided through the light diffuser relfection board 4. In this embodiment, as shown on FIG. 4, the member 8 such as a half mirror shall be formed such that its upper and lower surfaces 8A and 8B are substantially flush with the upper and lower surfaces 4A and 4B of the light diffuser reflection board 4, respectively.

An example of the operation of the present invention with such construction shall be explained below.

For instance, the light source $3_2$ shall be explained. As shown on FIG. 3 and FIG. 4, a light along an optical path a from the light source $3_2$ comes incident on the lower surface 4B of the light diffuser reflection board 4 from its under side, where it is reflected in accordance to the light reflectivity of the lower surface 4B of the light diffuser reflection board 4 and a reflection light of a predetermined amount relative to the incident light irradiates along an optical path al onto the object 1 (although it is not shown on FIG. 3, it is shown on FIG. 1) which is located under the light diffuser reflection board 4. Also, a light along an optical path b with the same intensity as that of the light a from the same light source $3_2$ is incident on the lower surface 8B of the member 8 such as a half mirror or the like that is tightly fitted into the see through-hole 5 of the light diffuser reflection board 4, at where it is reflected to become a reflection light to irradiate upon the object 1 along an optical path b1 in the same manner as the reflection light a1.

In this case, as stated above, the light reflectivity of the under surface 8B of the member 8, which is a half mirror, semi transparent plate or the like, has substantially the same light reflectivity as that of the under surface 4B of the light diffuser reflection board 4. Therefore, the amount of the reflected light b1 from the under surface 8B of the member 8 such as the half mirror or the like, is approximately the same as that of the reflected light a1 as reflected on the under surface 4B of the light diffuser reflection board 4. In other words, when irradiated with the light from the same light source, according to the present invention, as far as light reflection is concerned, the light diffuser reflection board 4 and member 8 may be deemed to possess a generally same optical characteristic. Therefore, even though the object 1 is a body with a reflective surface of high light reflectivity such as a mirror, it is hardly an occurance where the entire see through-hole 5 is reflected on the object 1 and hence the image of the through-hole 5 is picked up by the camera 2 together with the image of the object 1 on which the former is overlapped. In other words, it can be avoided that the camera 2 photosenses the image of the object 1 on which the image of through-hole 5 is superimposed in the case of the prior art.

Further, in this case, while the light diffuser reflection board 4 and the member 8 such as a half mirror can be considered the same material in relation of the light reflection, it is feared that the boundry line between the board 4 and the member 8 be reflected on the object 1 and the image of the boundry line would be overlapped on the image of object 1 and then they are picked up by the camera 2. However, as above mentioned, since the board 4 and the member 8 both can be taken as the same material in relation to the light reflection, the image of the boundary line would be very faint and shall not cause any problems to pickup the image of the object 1.

Figure 2:
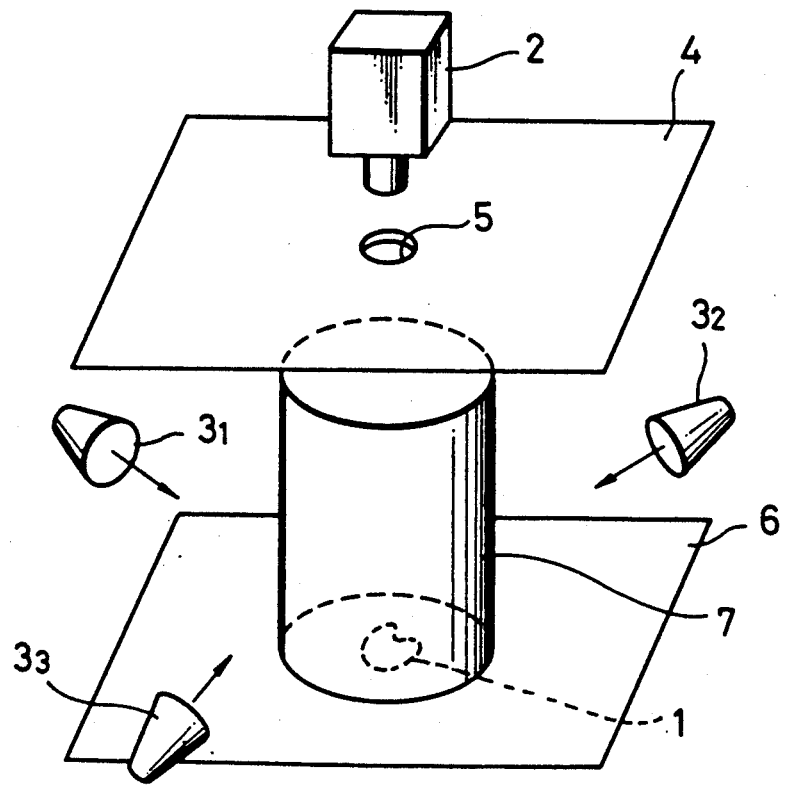

Although the above is the case where the present invention is applied to the example of the prior art as shown on FIG. 1, it is apparent that the same effects are obtained when the present invention is also applied to the example of the prior art as shown on FIG. 2.

It is also noted that in the above described example of the present invention, while it is the case where the light diffuser reflection board 4 and member 8 are of the same thickness, the essence of the invention is that the under surfaces 4B and 8B of the both be on the same plane. Therefore, as long as both under surfaces 4B and 8B are on the same plane, the thickness of member 8 may be selected thinner than the hickness of the light diffuser reflection board 4. Thus, the amount of light that passes through the member 8 shall increase to be better suitable for photosensing.

According to the above described present invention, by tightly fitting or close adherence of the member 8 such as a half mirror into the see through-hole 5, it can be avoided that the image of the see through-hole 5 is superimposed on that of the object 1 and then they are picked up by the camera 2 as was with the prior art.

Further, by the use of member 8, the image of see through-hole 5 is not picked up so that the diameter thereof can be made larger than that of the prior art. As a result, the object 1 can be located close to the camera which will prevent the fault of the prior art where the device was bulky or the like and to the contrary, the device size shall be compact.

It will be apparent that many modifications and variations could be effected by one skilled in the art without departing from the spirits or the scope of the novel concepts of the present invention so that the spirits or scope of the invention should be determined by the appended claims only.

I claim as my invention:

1. A photosensing device comprising:
   a) means for photosensing the image of an object to be inspected;
   b) a light diffuser reflection board located between said photosensing means and aid object and having a see-through-hole through which said photosensing means views said object;
   c) a light source located between said light diffuser reflection board and said object and for indirectly irradiating said object; and
   d) an insert member having a light reflectivity substantially the same as that of said light diffuser reflection board and the property of passing light therethrough, said insert member being tightly fit in said see-through-hole to permit the image of said object to be photosensed through said insert member.

2. The photosensing device according to claim 1, wherein lower surfaces of said light diffuser board and said insert are maintained in a common plane.

3. The photosensing device as claimed in claim 2, wherein said insert member is a half mirror.

4. The photosensing device as claimed in claim 2, wherein said insert member is a semi transparent plate.

5. The photosensing device as claimed in claim 2, wherein said insert member is selected thinner than said light diffuser reflection board.

6. The photosensing device according to claim 1, wherein the light from said light source is initially incident upon an under surface of said light diffuser reflection board and the insert member and reflected therefrom on to said object.

7. The photosensing device according to claim 1, including a housing of light diffusing material surrounding said object and the light from said light source is applied to the exterior of said housing to pass therethrough on to said object.

* * * * *